(12) United States Patent
Tatsubori et al.

(10) Patent No.: US 8,201,176 B2
(45) Date of Patent: Jun. 12, 2012

(54) DETECTING THE STARTING AND ENDING OF A TASK WHEN THREAD POOLING IS EMPLOYED

(75) Inventors: Michiaki Tatsubori, Kanagawa-ken (JP); Yohei Ueda, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 12/187,282

(22) Filed: Aug. 6, 2008

(65) Prior Publication Data

US 2010/0037222 A1   Feb. 11, 2010

(51) Int. Cl.
 *G06F 9/455* (2006.01)
 *G06F 9/46* (2006.01)
(52) U.S. Cl. ...................................................... 718/102
(58) Field of Classification Search ........................ None
 See application file for complete search history.

(56) References Cited

U.S. PATENT DOCUMENTS

| 7,730,119 B2 * | 6/2010 | Bates et al. .................... 709/201 |
| 2002/0120918 A1 * | 8/2002 | Aizenbud-Reshef et al. 717/127 |
| 2005/0015773 A1 * | 1/2005 | Gorman et al. ................ 719/310 |
| 2005/0086359 A1 * | 4/2005 | Banerjee et al. .............. 709/232 |
| 2005/0093881 A1 * | 5/2005 | Okita et al. ................... 345/589 |

\* cited by examiner

*Primary Examiner* — Corey S Faherty
(74) *Attorney, Agent, or Firm* — Vazken Alexanian

(57) ABSTRACT

Starting and ending of a task is detected, where thread pooling is employed. Threads perform a wait operation on a given object are monitored, and threads performing a notify/notify-all operation on the given object are monitored. A labeled directed graph is constructed. Each node of the graph corresponds to one of the threads. Each edge of the graph has a label and corresponds to performance of the wait or notify/notify-all operation. An identifier of the given object is a label of a number of the edges. A set of nodes is selected that each has an edge having the same label. The threads of these nodes are worker threads of a thread pool. The threads of the nodes that are connected to the set of nodes are master threads. An object having an identifier serving as the label of the edges to the set of nodes is a monitoring mechanism.

18 Claims, 5 Drawing Sheets

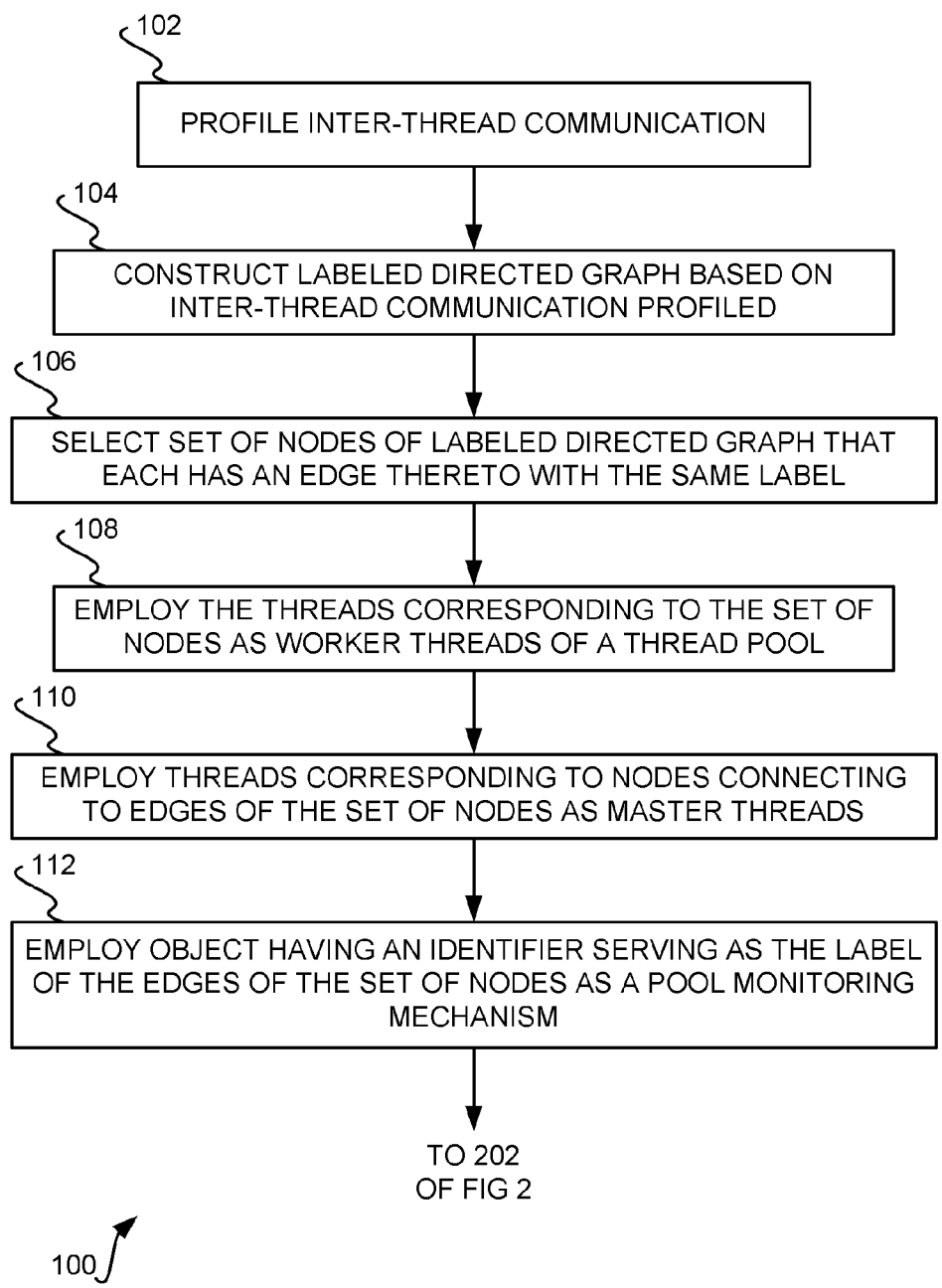

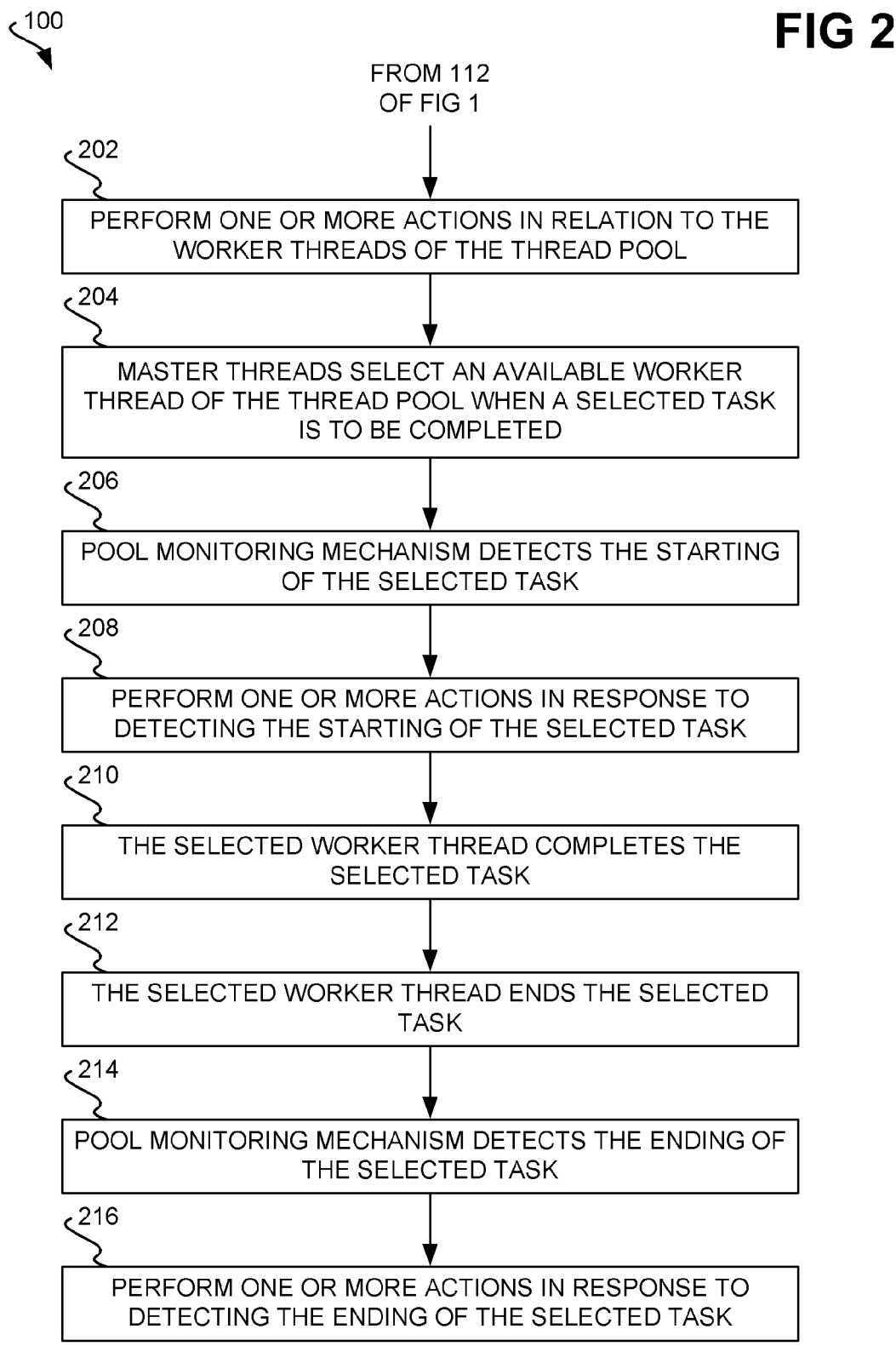

FIG 3

```
public class WorkQueue {
   private final PoolWorker[] threads;
   private final LinkedList queue;

public WorkQueue(int nThreads) {
      queue = new LinkedList();
      threads = new PoolWorker[nThreads];
      for (int i = 0; I < threads.length; ++i) {
         threads[i] = new PoolWorker();
         threads[i].start();
      }
   } public void execute(Runnable r) {
      synchronized(queue) {
         queue.addLast(r);
         queue.notify();
      }
   } private class PoolWorker extends Thread {
      public void run() {
         Runnable r;
         while (true) {
            synchronized(queue) {
               while (queue.isEmpty()) {
                  try {
                     queue.wait();
                  } catch (InterruptedException ignored) {
                  }
               }
               r = (Runnable) queue.removeFirst();
            } try {
               r.run();
            } catch (RuntimeException e) {
               //
            }
         }
      }
   }
}
```
⟵ 300

DETECTING THE STARTING AND ENDING OF A TASK WHEN THREAD POOLING IS EMPLOYED

FIELD OF THE INVENTION

The present inventions relates to thread pooling, and more particularly to detecting the starting and ending of a task that is completed by a thread of a thread pool.

BACKGROUND OF THE INVENTION

A task is a set of computer-executable instructions that when performed process data, such as reading, manipulating, and/or writing data. Traditionally, when a task is started, a thread is created to perform the task, and when the task has ended, the thread is terminated. A thread is the lowest-level execution of a set of instructions (i.e., the execution of a task), where a number of threads may, for instance, be concurrently performed to execute a process of a computer program, where a process is different than a thread, and may encompass one or more concurrently executing and/or non-concurrently executing threads.

A difficulty with creating a thread when a task is to be performed and terminating the thread when the task has ended is that a certain amount of overhead is needed to create and terminate (i.e., destroy) threads. A solution to this approach is known as thread pooling. In thread pooling, a pool of threads are initially created and remain in existence (i.e., are not terminated or destroyed), asynchronously with the execution of tasks. When a task has to be executed, an existing available thread is selected from the pool to perform the task. When the task has ended, the thread in question is not terminated, but rather returns to the pool as an available thread.

A problem with thread pooling, however, is that it substantially prevents the ability to detect when a task has started or ended. Generally, the starting of a task can be detected when a thread is created to execute the task, and the ending of the task can be detected when the task that was created to execute the task has been terminated. However, in thread pooling, threads are not created and destroyed synchronously with the execution of the tasks. This means that it can be difficult to detect when a given task has started or ended. For this and other reasons, there is a need for the present invention.

SUMMARY OF THE INVENTION

The present invention relates to detecting the starting and ending of a task when thread pooling is employed. A method according to an embodiment of the invention is for detecting a selected task starting and ending when thread pooling is employed. Inter-thread communication is monitored, by monitoring first threads performing a wait operation on a given object and by monitoring second threads performing a notify operation and/or a notify-all operation on the given object. A labeled directed graph is constructed based on the inter-thread communication that has been profiled.

The labeled directed graph includes a number of nodes and one or more directed edges. Each node corresponds to one of the first and the second threads. Each directed edge has a label, connects a first node and a second node, and corresponds to performance of one of the wait operation and the notify operation and/or the notify-all operation on an object from two corresponding threads. The direction of the edge is determined by regarding a thread (and thus a node) performing the wait operation as the destination of the edge and by regarding another thread (and thus another node) performing the notify and/or notify-all operation as the originator of the edge. An identifier of the given object serves as a label of each of one or more of the directed edges.

The method selects a set of nodes of the labeled directed graph that each has a directed edge thereto having a same label. The method employs the threads to which the nodes of the set of nodes correspond as worker threads of a thread pool in relation to which thread pooling is employed for completing tasks including the task in relation to which the method is being performed. The method employs the threads to which the nodes that are connected to the nodes of the set of nodes correspond as master threads in relation to which thread pooling is employed for completing the tasks. The master threads select an available worker thread of the thread pool when one of the tasks is to be completed.

The method also employs an object having an identifier serving as the same label of the directed edges to the set of nodes as a pool monitoring mechanism. The pool monitoring mechanism detects starting of the selected task by detecting when the master threads select one of the worker threads to perform the selected task by performing the notify operation and/or the notify-all operation. The pool monitoring mechanism also detects ending of the selected task by detecting when the one of the worker threads performs the wait operation.

A method according to another embodiment of the invention is also for detecting a selected task starting and ending when thread pooling is employed. The method detecting starting of the selected task by detecting when a master thread selects an existing available worker thread within a pool of existing available worker threads by the master thread performing a notify-operation and/or a notify-all operation. The existing available worker thread selected completes the selected task. The method detects ending of the selected task by the existing available worker thread selected by detecting when the existing available worker thread performs a wait operation.

An article of manufacture according to an embodiment of the invention includes a tangible computer-readable medium and means in the medium. The tangible computer-readable medium may be a recordable data storage medium, or another type of tangible computer-readable medium. The means in the medium may be one or more computer programs stored on the medium. The means is for profiling inter-thread communication, by monitoring first threads performing a wait operation on a given object and by monitoring second threads performing a notify operation and/or a notify-all operation on the given object.

The means is further for constructing a labeled directed graph based on the inter-thread communication that has been profiled. The labeled directed graph includes a number of nodes and one or more directed edges. Each node corresponds to one of the first and the second threads. Each directed edge has a label, connects a first node and a second node, and corresponds to performance of one of the wait operation and the notify operation and/or the notify-all operation. An identifier of the given object serves as a label of each of one or more of the directed edges.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 1 and 2 are flowcharts of a method for detecting the starting and ending of a task when thread pooling is employed, according to an embodiment of the invention.

FIG. 3 is a diagram of sample computer code that utilizes thread pooling, in relation to which embodiments of the invention can be performed.

DETAILED DESCRIPTION OF THE DRAWINGS

Figure 4:
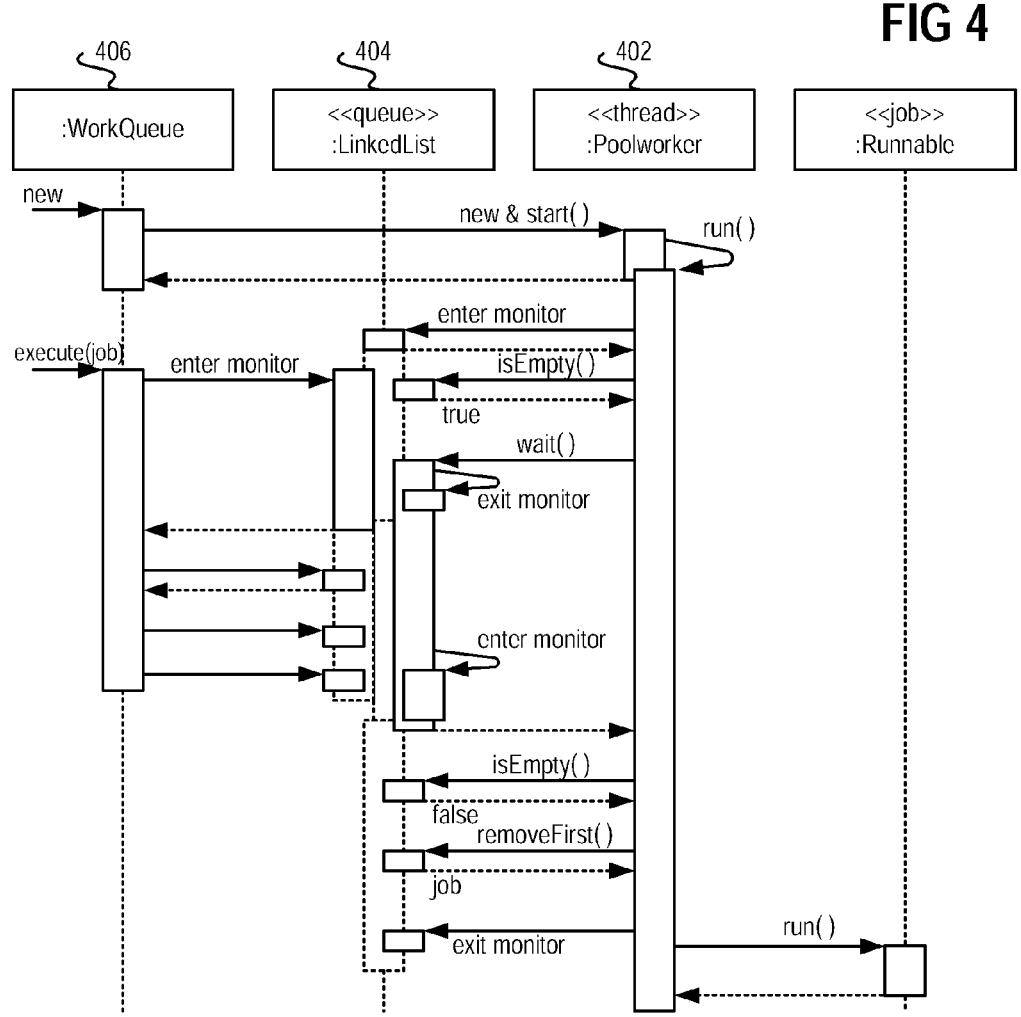
FIG. 4 is a diagram of a graphical sequence chart for the computer code of FIG. 3, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Embodiments of the invention are described in the detailed description as follows. First, a general method for detecting the starting and ending of a task when thread pooling is employed is described, including variations of various parts of the method. Thereafter, a concrete example of detecting the starting and ending of a task when thread pooling is employed is described. The concrete example at least implicitly performs the general method.

FIGS. 1 and 2 show a method 100 for detecting the starting and ending of a task when thread pooling is employed, according to an embodiment of the invention. Referring first to FIG. 1, inter-thread communication is profiled (102). In particular, threads performing a wait operation in relation to or on a given object are monitored, and threads performing a notify operation or a notify-all operation on the given object are also monitored. The given object may be an object in an object-oriented programming (OOP) sense, where the object may have data and/or methods exposed by one or more interfaces. Thus, a thread can call a wait, notify, or notify-all operation in relation to an object. Profiling of inter-thread communication in part 102 can thus include recording an identifier of the object in question, as well as the identifier of the thread performing the wait operation on the object and/or the identifier of the thread performing the notify or notify-all operation on the object.

A notify operation or a notify-all operation is typically performed by a master thread to start one or more threads of a thread pool start to execute one or more corresponding tasks. More specifically, a notify operation is performed by a master thread to have a worker thread started so that the worker thread executes a corresponding task. By comparison, a notify-all operation is performed by a master thread to have more than one worker thread started so that the worker threads (plural) execute corresponding tasks (plural). In either case, a given worker thread is available and is in a waiting state, such that it can begin executing a corresponding task. A wait operation is thus performed by a given worker thread when the worker thread has completed its assigned task, such that the worker thread in question re-enters a waiting state and is again available to perform another task.

A labeled directed graph is constructed based on the inter-thread communication that has been profiled (104). The graph is a directed graph in that the edges connecting the nodes of the graph are directional, such that each edge points from one node to another node. The graph is a labeled graph in that the edges connecting the nodes of the graph are labeled. Each node corresponds to one of the threads that have been monitored in part 102. Each directed edge connects two nodes, and can be said to correspond to the performance of the wait operation, the notify operation, and/or the notify-all operation. That is, a directed edge connects a node corresponding to a master thread that has performed a notify operation to a node corresponding to a worker thread that has been so notified, where the worker thread in question subsequently performs the wait operation. The identifier of the object described in relation to part 102 serves as the label of one or more of the directed edges. More specifically, where a wait, notify, or notify-all operation is performed in relation to a given object, the identifier of this given object is used as the label of the directed edges corresponding to the performance of the wait, notify, or notify-all operation performed in relation to this given object.

A set of nodes within the directed graph is selected that each has a directed edge thereto with the same label (106). For example, there may be a node corresponding to a master thread, and four nodes corresponding to worker threads. If the former node has directed edges to all the latter nodes, the latter set of nodes is selected where the edges in question all have the same label. In one embodiment, a k-cut approach or technique may be employed to obtain the set of nodes, as can be appreciated by those of ordinary skill within the art.

The threads corresponding to the set of nodes selected in part 106 are employed as the worker threads of a thread pool (108). Similarly, the threads corresponding to the nodes having edges connecting to the set of nodes are employed as the master threads (110). In the example of the previous paragraph, there is a first node connected to four second nodes, where the four nodes are selected as the set of nodes. The thread corresponding to the first node is employed as the master thread, and the threads corresponding to the four second nodes are employed as the worker threads.

Finally, the object having the identifier that serves as the label of the edges of the set of nodes selected in part 106 is employed as a pool monitoring mechanism (112), as will be described later in the detailed description. Furthermore, in one embodiment, the method 100 may include additional parts. For instance, the end of a previous task and the start of a following task (by the same worker thread) may be employed as the timing in which the worker thread in question acquired a lock by at least implicitly performing a wait operation.

Referring next to FIG. 2, one or more actions may be performed in relation to the worker threads of the thread pool (202). Thus, part 202 is performed in response to performing part 108 of FIG. 1. The actions performed in part 202 in one embodiment include adding affinity to thread pools. By virtue of part 202 being performed, the utilization of a thread pool is detected. Therefore, processor affinity can be set to the thread pools. Setting processor affinity can improve the utilization efficiency of cache memory. Since the threads in the same thread pool are likely to access the same code and the same data, the utilization efficiencies of the cache memory and a translation lookaside buffer (TLB) can be improved when these worker threads are executed from the same processor set. The number of processors assigned to each thread pool is determined in accordance with the ratio of the number of detected threads in each thread pool to the total number of threads in the thread pool. Furthermore, if bias in the utilization rate is observed by monitoring the utilization rate of the assigned processors, the processor can be redistributed for load-balancing purposes.

The actions performed in part 202 in one embodiment can also include controlling priority of thread pools. When more then one thread pool is defined, it can be difficult to optimize the number of threads within the thread pools. This is because the amount of workload the thread pools are processing may not be predictable, and the amount can vary in accordance with the elapse of time. When the number of the threads in load-balancing is improperly defined, only threads in particular thread pools may be activated, while few threads in other thread pools may be executed, worsening response time. Appropriate load-balance can be achieved by controlling the priority of the threads in the thread pools. Dynamic load balancing monitors the response time in which a thread spends in dealing with a requested process, and changes the thread priority in accordance with the variation of time spent.

The master threads select an available worker thread within the thread pool when a selected task is to be completed (204). The pool monitoring mechanism detects the starting of the selected task by detecting the master threads performing the notify operation and/or the notify-all operation (206). The method may further perform one or more actions in response to detecting the start of the selected task (208). The actions performed in part 208 in one embodiment including actions geared towards avoiding thread starvation.

For example, such thread starvation-oriented techniques may decrease the priority of a thread that runs for a long time to avoid a starvation situation in which the thread occupies processor resources for so long that processor time cannot be assigned to newly created threads. The response of a server, for instance, can be improved by prioritizing a number of newly incoming lightweight (from the perspective of processing time) requests instead of some time-consuming requests. However, when the same thread repeatedly processes requests using the thread pool, it ordinarily cannot be determined whether the thread spends a long time in processing a single time-consuming request or whether the thread consecutively processes a number of requests. By comparison, embodiments of the invention provide for such determination insofar as the starting of a task is detected. If a given thread is executing a number of requests, its priority may thus be increased, and if it is executing a single large request, its priority may be decreased.

At some point, the selected worker thread completes the selected task to which it has been assigned by the master threads (210). As such, the selected worker thread ends the selected task by performing the wait operation (212). The pool monitoring mechanism detects the ending of the selected task by detecting the performance of the wait operation performed by the selected worker thread (214). The method may perform one or more actions in response to detecting the ending of the selected task (216). The actions performed in part 216 in one embodiment include garbage collection-oriented actions.

For example, a server may permit a single thread to process a single request. While the request is being processed, a response is created, along with a number of objects. After the response has been returned, most of the objects are no longer needed, and thus are said to become garbage. Such no longer needed data (i.e., garbage) can be efficiently collected by performing thread-local garbage collection after the request has been completed. Not performing garbage collection as part of the thread itself also improves response time. As such, this type of efficient thread-local garbage collection can be performed after the ending of the selected task has been detected.

The method 100 of FIGS. 1 and 2 thus permits the starting and the ending of tasks to be detected even when thread pooling is employed. As such, the number of opportunities for a lower layer, such as a Java virtual machine, to perform optimization like thread affinity addition, thread priority control, thread starvation avoid, and efficient garbage collection, as have been described, is increased. It is noted that the threads and objects that have been described can be considered as being implemented in both software and hardware, in that underlying hardware (such as processors and memory) execute and/or store the threads and the objects.

Two parts of the method 100 are now described in supplemental detail. First, as to the construction of a labeled directed graph in part 104, since many threads belonging to the same thread pool are created from the same object-oriented class, creating such a graph according to the class creating the threads can improve accuracy of detecting the worker threads. For example, when the thread is created from a subclass of the java.lang.Thread class, the creating class (i.e., object) can be identified by checking the method at the starting point of a stack trace. As another example, when the thread is created from an object implementing java. lang.Runnable interface, a Runnable object is identified by checking the fields of a thread object, which leads to the identification of the creating object in question.

Second, as to the employment of the object in part 112 as a pool monitoring mechanism, once this object has been identified, a "monitor enter identifying" phase can appear. When the wait operation is called during this phase, the method code analysis is performed within the stack frame being trace to identify the location of the corresponding "monitor enter" operation. When the identification succeeds, the "monitor enter identifying" phase has been completed.

If the identification fails, however, a different approach can be used. First, every method stored in a given stack frame can be analyzed, and a piece of code be inserted just before every "monitor enter" operation that is likely to acquire the pool monitor. The monitor identifiers and the locations of the "monitor enter" operations are then saved. Second, when the wait operation is thereafter called, the "monitor enter" operation corresponding to the saved information is identified, and the code that has been inserted is restored to the original code. Similarly, the "monitor exit" operation can be detected after the wait operation has been executed.

It is noted that the detected "monitor enter" operation indicates the break of a task, and the "monitor exit" operation indicates the start of a parallel task. For example, the real-time response time of a task can be measured using the "monitor enter" and the "monitor exit" operations. The response time is the elapse of time—excluding the execution time of the wait operation—from the time the "monitor exit" operation is executed to the time the "monitor enter" operation is executed.

An example of operation of an embodiment of the invention is now described. FIG. 3 shows sample computer code 300 that utilizes thread pooling, in relation to which embodiments of the invention can be performed. FIG. 4 shows a graphical sequence chart 400 for the computer code 300, according to an embodiment of the invention. A thread of a PoolWorker object, identified by the reference number 402, is a pooled thread which executes a task when a job is available in a queue, such as the LinkedList object identified by the reference number 404. Otherwise, the thread waits for a new job to arrive. A workQueue object, identified by the reference number 406, accepts a job request on an irregular basis and places the job into the queue via an executes method, which is a synchronous method that may be executed by a server thread or the like.

Figure 5:
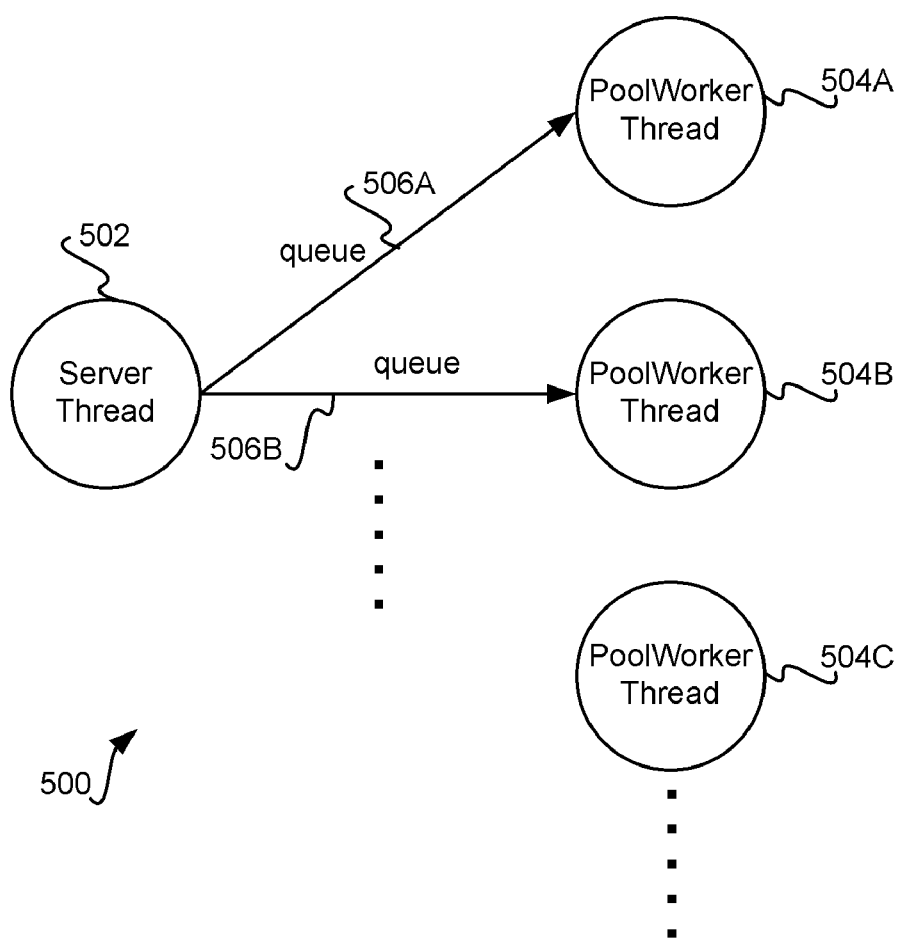
FIG. 5 is a diagram of a labeled directed graph for the graphical sequence chart of FIG. 4 and the computer code of FIG. 3, according to an embodiment of the invention.

FIG. 5 shows a labeled directed graph 500 corresponding to the graphical sequence chart 400 and the computer code 300, according to an embodiment of the invention. The graph 500 includes nodes 502, 504A, 504B, and 504C. The node 502 corresponds to a server thread, which is a master thread. The nodes 504B, 504C, and 504D correspond to PoolWorker threads, which are worker threads. There are edges 506A and 506B from the node 502 to the threads 504A and 504B. This means that the server thread corresponding to the node 502 has invoked a notify operation (in particular) to cause the threads corresponding to the nodes 504A and 504B to execute tasks. Once the nodes 504A and 504B are finished with the tasks, they execute a wait operation. The notify operation and the wait operation are executed in relation to the queue object, which becomes the pool monitoring mechanism, and such that the label of the queue object is the label of the edges 506A and 506B.

Thus, in the graph 500, the k-cut can be applied to the queue-labeled edges, where k is the number of PoolWorker threads in total. The graph produces {ServerThread} as the master thread group and {PoolWorker thread 1, PoolWorker thread 2} as the worker thread group. The only wait operation recorded in the profile is the one called in queue.wait() in FIG. 3. The code analysis subsequent to the profiling indicates that the location at which the lock is acquire before the wait operation is identified as the line "synchronized(queue)" in FIG. 3. Therefore, this location can be regarded as the break of the task for each thread (PoolWorker thread k) of the worker thread group.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method for detecting a selected task starting and ending when thread pooling is employed, comprising:
    profiling inter-thread communication, by monitoring one or more first threads performing a wait operation on a given object and by monitoring one or more second threads performing a notify operation and/or a notify-all operation on the given object;
    constructing a labeled directed graph based on the inter-thread communication that has been profiled,
        the labeled directed graph comprising a plurality of nodes and one or more directed edges, each node corresponding to one of the first and the second threads, each directed edge having a label, each directed edge connecting a first node and a second node, each directed edge corresponding to performance of one of the wait operation and the notify operation and/or the notify-all operation, where an identifier of the given object serves as a label of each of one or more of the directed edges;
    selecting a set of nodes of the labeled directed graph that each has a directed edge thereto having a same label;
    employing the threads to which the nodes of the set of nodes correspond as a plurality of worker threads of a thread pool in relation to which thread pooling is employed for completing tasks including the selected task;
    employing the threads to which the nodes that are connected to the nodes of the set of nodes correspond as one or more master threads in relation to which thread pooling is employed for completing the tasks, where the master threads select an available worker thread of the thread pool when one of the tasks is to be completed; and,
    employing an object having an identifier serving as the same label of the directed edges to the set of nodes as a pool monitoring mechanism,
    wherein the pool monitoring mechanism detects starting of the selected task by detecting when the master threads select one of the worker threads to perform the selected task by performing the notify operation and/or the notify-all operation,
    and wherein the pool monitoring mechanism detects ending of the selected task by detecting when the one of the worker threads performs the wait operation.

2. The method of claim 1, further comprising selecting, by the master threads, an available worker thread of the thread pool when the selected task is to be completed, by performing the notify operation and/or the notify-all operation.

3. The method of claim 2, further comprising detecting, by the pool monitoring mechanism, starting of the selected task by detecting when the master threads select the available worker thread by performing the notify-operation and/or the notify-all operation.

4. The method of claim 3, further comprising performing one or more actions in response to detecting starting of the selected task.

5. The method of claim 2, further comprising completing the selected task by the available worker thread selected by the master threads.

6. The method of claim 5, further comprising, after completing the selected task, performing the wait operation by the available worker thread selected by the master threads.

7. The method of claim 6, further comprising detecting, by the pool monitoring mechanism, ending of the selected task by the available worker thread selected by the master threads performing the wait operation.

8. The method of claim 7, further comprising performing one or more actions in response to detecting ending of the selected task by the available worker thread selected by the master threads.

9. The method of claim 1, further comprising performing one or more actions in relation to the plurality of worker threads of the thread pool.

10. The method of claim 9, wherein the actions are performed in response to employing the threads to which the nodes of the set of nodes correspond as the plurality of worker threads of the thread pool.

11. A method for detecting a selected task starting and ending when thread pooling is employed, comprising:
    detecting starting of the selected task by detecting when a master thread selects an existing available worker thread within a pool of existing available worker threads by the master thread performing a notify-operation and/or a notify-all operation,
        where the existing available worker thread selected completes the selected task;

detecting ending of the selected task by the existing available worker thread selected by detecting when the existing available worker thread performs a wait operation; and profiling inter-thread communication, by monitoring one or more first threads performing the wait operation on a given object and by monitoring one or more second threads performing the notify operation and/or a notify-all operation on the given object, the first threads including the existing available worker thread and the second threads including the master thread; and, constructing a labeled directed graph based on the inter-thread communication that has been profiled, the labeled directed graph comprising a plurality of nodes and one or more directed edges, each node corresponding to one of the first and the second threads each directed edge having a label, each directed edge connecting a first node and a second node, each directed edge corresponding to performance of one of the wait operation and the notify operation and/or the notify-all operation where an identifier of the given object serves as a label of each of one or more of the directed edges.

12. The method of claim 11, further comprising:
selecting a set of nodes of the labeled directed graph that each has a directed edge thereto having a same label;
employing the threads to which the nodes of the set of nodes correspond as the pool of existing available worker threads in relation to which thread pooling is employed for completing tasks including the selected task; and,
employing a thread to which a node that is connected to the nodes of the set of nodes corresponds as the master thread in relation to which thread pooling is employed for completing the tasks.

13. The method of claim 12, further comprising, employing an object having an identifier serving as the same label of the directed edges to the set of nodes as a pool monitoring mechanism.

14. The method of claim 13, wherein the pool monitoring mechanism detects starting of the selected task by detecting when the master thread selects the existing available worker thread to perform the selected task by performing the notify operation and/or the notify-all operation, and wherein the pool monitoring mechanism detects ending of the selected task by detecting when the existing available worker thread performs the wait operation.

15. An article of manufacture comprising:
a non-transitory tangible computer-readable medium; and,
means in the medium for:
profiling inter-thread communication, by monitoring one or more first threads performing a wait operation on a given object and by monitoring one or more second threads performing a notify operation and/or a notify-all operation on the given object;
constructing a labeled directed graph based on the inter-thread communication that has been profiled,
wherein the labeled directed graph comprises a plurality of nodes and one or more directed edges, each node corresponding to one of the first and the second threads, each directed edge having a label, each directed edge connecting a first node and a second node, each directed edge corresponding to performance of one of the wait operation and the notify operation and/or the notify-all operation, where an identifier of the given object serves as a label of each of one or more of the directed edges.

16. The article of manufacture of claim 15, wherein the means is further for:
selecting a set of nodes of the labeled directed graph that each has a directed edge thereto having a same label;
employing the threads to which the nodes of the set of nodes correspond as a plurality of worker threads of a thread pool in relation to which thread pooling is employed for completing tasks including the selected task; and,
employing the threads to which the nodes that are connected to the nodes of the set of nodes correspond as one or more master threads in relation to which thread pooling is employed for completing the tasks, where the master threads select an available worker thread of the thread pool when one of the tasks is to be completed.

17. The article of manufacture of claim 16, wherein the means is further for employing an object having an identifier serving as the same label of the directed edges to the set of nodes as a pool monitoring mechanism.

18. The article of manufacture of claim 17, wherein the pool monitoring mechanism detects starting of the selected task by detecting when the master threads select one of the worker threads to perform the selected task by performing the notify operation and/or the notify-all operation, and wherein the pool monitoring mechanism detects ending of the selected task by detecting when the one of the worker threads performs the wait operation.

\* \* \* \* \*